Figure 1:
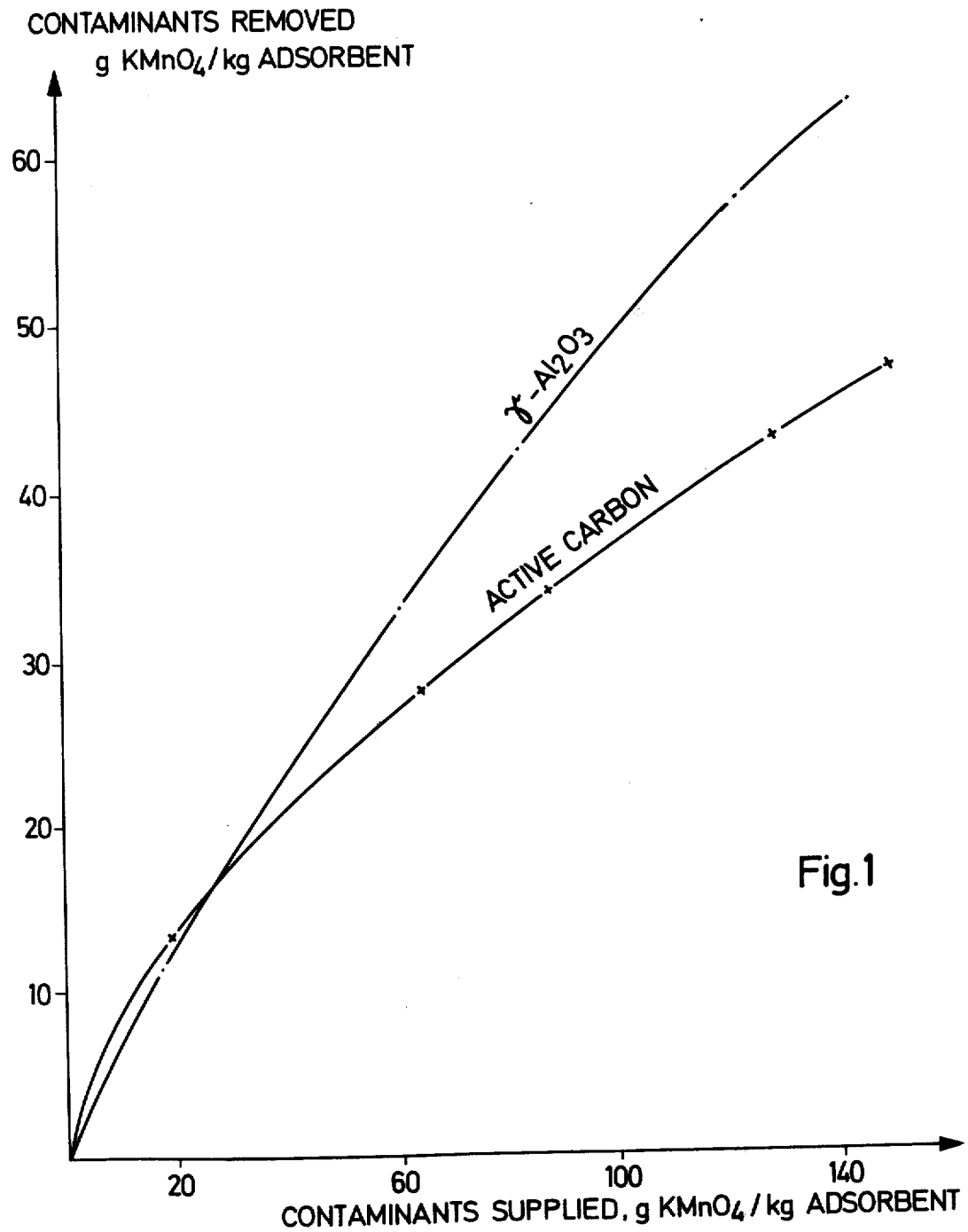

United States Patent [19]

Ploetz, deceased et al.

[11] 4,019,952
[45] Apr. 26, 1977

[54] METHOD OF PURIFYING THE WASTE WATER OF PAPER MILLS

[75] Inventors: Theodor Ploetz, deceased, late of Hoesel, Germany; by Adelbert Hasse, administrator, Ratingen; Volker Franzen, Heidelberg, both of Germany

[73] Assignee: Feldmuhle Anlagen- und Produktionsgesellschaft mit beschrankter Haftung, Duesseldorf-Oberkassel, Germany

[22] Filed: Dec. 12, 1975

[21] Appl. No.: 639,996

Related U.S. Application Data

[63] Continuation-in-part of Ser. No. 461,613, April 17, 1974, abandoned.

[30] Foreign Application Priority Data

Apr. 25, 1973 Germany .......................... 2320799

[52] U.S. Cl. ................................. 162/29; 210/18; 210/40
[51] Int. Cl.[2] ...................... C02C 5/02; C02C 5/10
[58] Field of Search ............. 210/2, 18, 24, 32, 33, 210/30, 26, 39, 40; 252/463; 162/29, 190

[56] References Cited
UNITED STATES PATENTS

| | | | |
|---|---|---|---|
| 3,346,336 | 10/1967 | Hayes | 252/463 |
| 3,625,886 | 2/1969 | Mattia | 210/32 |
| 3,676,334 | 7/1972 | Zuckerman et al. | 210/18 X |
| 3,763,040 | 10/1973 | Timpe et al. | 210/40 X |

OTHER PUBLICATIONS

"Purification of Bleaching Waste Water of the Pulp Industry with Aluminum," Ploetz Chem. Abstracts, vol. 83, 1975, Effective Date of Article Oct. 1974, (Papier Darmstadt).

*Primary Examiner*—S. Leon Bashore
*Assistant Examiner*—Peter F. Kratz
*Attorney, Agent, or Firm*—Hans Berman

[57] ABSTRACT

Granular γ-alumina in contact with the waste water of paper mills contaminated with oxygen-demanding, organic substances adsorbs the contaminants, particularly ligninsulfonic acids, and lowers the oxygen demand of the waste water much more effectively than activated charcoal, thereby permitting the purified waste to be fed directly to a secondary biological treatment without damaging the microorganisms.

3 Claims, 2 Drawing Figures

METHOD OF PURIFYING THE WASTE WATER OF PAPER MILLS

This application is a continuation-in-part of the copending application Ser. No. 461,613, filed on Apr. 17, 1974, and now abandoned.

This invention relates to the purification of waste water contaminated with oxygen-demanding organic substances, and particularly to a method of purifying the waste water of paper mills.

Purification of waste waters has recently become one of the most pressing problems facing the manufacturers of cellulose, paper, cardboard and the like. Conventional methods permit the removal of a major portion of the contaminants in the form of solid materials which may be burned under the factory boilers, but the effluent of the purification plants, considered satisfactoy until recently, still contains organic materials which sharply increase the oxygen demand of open waters into which they are released. The contaminants from the cellulose bleaching installation of such paper mills are similar in chemical nature and equally detrimental to the environment. The most severe waste water problems are faced by plants making and processing sulfite pulp because of the ligninsulfonic acids present in their effluents.

Because of their high oxygen demand, the conventionally purified waste waters of the paper industry, a term employed herein to encompass the cellulose and cardboard industry, cannot be purified by the microorganisms naturally occurring in open streams and lakes, and they would destroy the microorganims in a biological secondary treatment plant.

Attempts at removing organic contaminants from paper mill waste by adsorption on active carbon were unsatisfactory even after a conventional primary purification treatment.

It has now been found that the oxygen-demanding, organic impurities of paper mill waste water, particularly ligninsulfonic acids, can be removed almost completely by adsorption on granular alumina. $\gamma$-Alumina, which has an available surface area of more than 100 $m^2/g$, is most effective. As is well known, $\gamma$-alumina of high specific surface area is obtained by precipitating aluminum hydroxide from aqueous solutions of aluminum salts, and heating the hydroxide to a temperature between 500° and 1100° C. Overheating is to be avoided to minimize the conversion of the $\gamma$-alumina to the less effective $\alpha$-modification. However, the presence of some $\alpha$-alumina does not interfere seriously with the adsorption properties of a product mainly consisting of the $\gamma$-modification. Chemical attack of an overly acidic waste water on the adsorbent may be avoided by partial neutralization.

The available surface area of $\gamma$-alumina does not even approach the surface area of a corresponding weight of active carbon. Yet, in the removal of oxygen-demanding, organic impurities, granular alumina has been found to be surprisingly more effective than active carbon. The waste water purified by treatment with granular alumina according to this invention has an oxygen demand low enough to permit the effluent from the adsorption zone to be fed directly to a biological purification stage employing microorganisms capable of metabolizing residual organic matter.

The purification method of the invention may be performed batchwise. Waste water and granular alumina are mixed and the granular material is held suspended in the water by stirring the resulting mixture. The batch method is not economically attractive under conditions prevailing in paper mills, and the method of the invention readily lends itself to continuous operation. Waste water may be fed continuously to an adsorption zone in a suitable vessel, and the purified water continuously withdrawn from the zone while fresh regenerated alumina substantially free from adsorbed contaminants is fed to the zone, and alumina having contaminants adsorbed thereon is withdrawn from the zone periodically or continuously.

As compared to active carbon, contaminated $\gamma$-alumina can be regenerated in a simpler and more effective manner without loss of adsorption capacity by heating in the presence of oxygen, as in open air, to a temperature between 400° and 900° C, a regeneration temperature of 500° to 600° C being normally sufficient to volatilize all organic contaminants adsorbed, largely by oxidation, without reducing the specifice surface area of the adsorbent.

Figure 2:
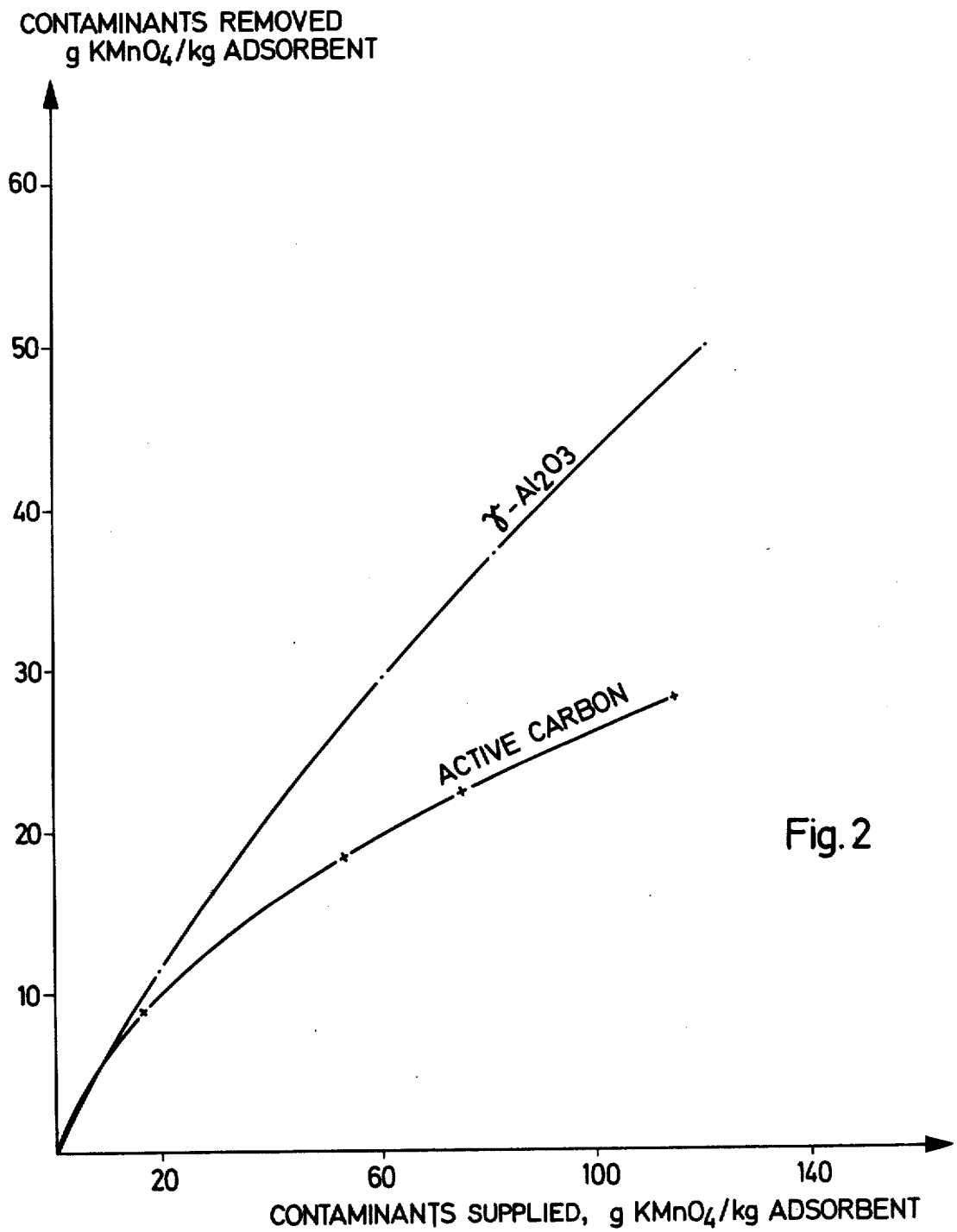

In the appended drawing, FIGS. 1 and 2 diagrammatically illustrate the effects of granular $\gamma$-alumina and of active carbon on oxygen-demanding ingredients of a paper mill waste water and of an aqueous ligninsulfonic acid solution respectively.

The following Examples are further illustrative of this invention.

EXAMPLE 1

A strongly-colored, conventionally pre-treated waste water was discharged from a chlorination operation in which raw cellulose produced by the sulfite process was being bleached. The waste water had a platinum number of 2500 and a potassium permanganate number of 3000 mg/liter. It was fed continuously at a rate of five liters per hour to the bottom end of an upright, cylindrical column having a cross section of 50 $cm^2$ and a height of 2 meters and overflowed from the top of the column after an average dwell time of two hours.

The column initially contained 2.2 kg granular $\gamma$-alumina held in aqueous suspension in the lowermost 60 cm of the column by a stirrer rotating about the axis of the column at a speed of four revolutions per minute. The size of 80 percent of the alumina grains exceeded 62 microns.

The effluent appeared colorless and fully transparent to the naked eye and had a platinum number of 20 and a potassium permanganate number of 200 mg/liter. No significant deterioration of the effluent was observed until the amount of polymeric organic matter retained by the column had reached the equivalent of 200 g potassium permanganate, corresponding to approximately 70 g organic contaminant, per kilogram of the granular material.

To permit continuous operation, fresh or regenerated aluminum oxide grains were fed to the top of the column while the grains loaded with adsorbed contaminants were withdrawn periodically from the bottom. The withdrawn material was regenerated by heating it to 550° for 3 hours. The active surface of the regenerated material was measured and was found to remain virtually unchanged in several regeneration cycles.

The waste water purified by contact with the suspended, granular aluminum oxide was then subjected to further treatment by microorganisms in a manner conventional in itself, and the water discharged from the secondary treatment stage was fit to be discharged into a stream without affecting the flora and fauna of the stream.

EXAMPLE 2

Four cylindrical glass tubes having the same internal diameter of 19 mm were set up vertically. Two tubes were each charged with 250 g γ-alumina having a particle size of 1–3 mm to respective heights of 910 and 925 mm. The two other tubes were charged each with 100 g active carbon of 35–50 mesh (0.3–0.5 mm) to respective heights of 900 and 950 mm. The alumina was a commercial product which was activated prior to use by washing it free of soluble impurities and calcining at 560° C as is conventional. The active carbon was the best grade of activated charcoal commercially available (E. Merck, Darmstadt).

One column of each pair was employed for purification of an effluent from the chlorination stage of the sulfite pulp mill referred to in Example 1 which was adjusted to pH 8.5 with sodium hydroxide and had an oxygen demand of 2610 mg $KMnO_4$ per liter. The two other columns were fed an aqueous solution of commercial ligninsulfonic acid adjusted to pH 8.5 and diluted to make its oxygen demand 2560 mg $KMnO_4$ per liter. The solutions were pumped through the respective columns at a rate of 1 ml per hour per gram adsorbent from the morning of a first day to the evening of the third day. Because of the lower bulk density of the carbon charge and its smaller weight, the average contact time was approximately 150–170 minutes for carbon and approximately 62–44 minutes for alumina.

Specimens of column effluent were tested for oxygen demand by titration with $KMnO_4$ in the morning and evening of each day. From the titration results, the known weight of the adsorbent charge, and the known volume of tested liquid that had passed through the column between the taking of successive specimens, the total amount of contaminants fed to the column and the total amount of contaminants removed at the taking of each specimen were calculated in g $KMnO_4$ per kg adsorbent.

Curves indicative of the relationship between contaminants fed and contaminants removed are shown in FIG. 1 for the papermill waste liquid and in FIG. 2 for the ligninsulfonic acid solution. The curves show an approximately equal initial rate of contaminant removal for both adsorbents, but a much more rapid decline in adsorptive power by the carbon than for the alumina although the specific testing conditions were chosen to favor the carbon.

The specific surface area of the carbon used was much greater than that of the alumina, as is evident from the sizes of the particles employed and from the known properties of active carbon and activated alumina. the pH value of the solutions was adjusted to the alkaline range in which carbon is known to be particularly effective while alumina is known from the commonly owned, copending application Ser. No. 566,939, filed Apr. 10, 1975, to be most effective in removing contaminants from acidic waste water of paper mills. Ultimately, the time of contact between the liquids and carbon was longer than that between the liquids and the alumina.

From tests performed on other pure materials known to contribute to the oxygen demand of sulfite paper mill waste in the manner represented in FIG. 2, it appears that the superiority of γ-alumina over active carbon in the purification of paper mill waste, as shown in FIG. 1, is due to a large extent to the better adsorption of ligninsulfonic acids by the alumina, the term "ligninsulfonic acids" being used in the usual manner to designate the various sulfonic acids derived from lignin and found in sulfite liquor and other waste products of sulfite pulp mills, such as the chlorination stage wastes more specifically described above, the precise chemical constitution of only a small percentage of such ligninsulfonic acids being known. From tests on waste water from the manufacture of sulfate pulp, it is apparent that γ-alumina adsorbs lignin and derivatives of lignin other than the sulfonic acids, and that the improved purity of treated sulfite mill effluent is not due only to the removal of ligninsulfonic acids, but to the removal of lignin values generally from the aqueous material.

No harmful effect of residual contaminants on the biological waste water treatment stage was observed after treatment of the various waste waters by the process of the invention. These residual contaminants mainly consisted of mono- and oligosaccharides readily metabolized by the microorganisms.

The process variables referred to in the Examples are not critical. While an ambient temperature of approximately 20° C prevailed in the adsorption zones, the temperature may be chosen otherwise. The particle size of the alumina is equally non-critical if the grains have the necessary specific surface. Very coarse particles may still be useful at least in batch operation. The amount of alumina will be chosen according to the available dwell time, the degree of contamination of the waste water, the purification effect desired, the size and shape of the adsorption zone, and like process variables and may require some experimentation.

It should be understood, therefore, that the foregoing disclosure relates only to a preferred embodiment, and the specific examples of the invention chosen for the purpose of the disclosure may be modified widely without departing from the spirit and scope of the invention set forth in the appended claims.

What is claimed is:

1. A method of purifying waste water of a paper mill of contaminating, oxygen-demanding lignin values which comprises:
   a. holding granular γ-alumina in contact with said waste water until said lignin values are adsorbed on said alumina and the oxygen demand of said waste water is reduced; and
   b. separating the waste water of reduced oxygen demand from the alumina having said lignin values adsorbed thereon.

2. A method as set forth in claim 1, wherein said lignin values consist predominantly of ligninsulfonic acids.

3. A method as set forth in claim 2, wherein the separated waste water of reduced oxygen demand is contacted with microorganisms capable of metabolizing mono- and oligosaccharides until further purified.

* * * * *